(12) United States Patent
Matsumura et al.

(10) Patent No.: US 10,896,338 B2
(45) Date of Patent: Jan. 19, 2021

(54) CONTROL SYSTEM

(71) Applicant: TOYOTA JIDOSHA KABUSHIKI KAISHA, Toyota (JP)

(72) Inventors: Takeshi Matsumura, Numazu (JP); Jun Sato, Susono (JP); Kenichiroh Hara, Yokohama (JP); Junya Kasugai, Kakamigahara (JP); Koichiro Yamauchi, Nagaizumi-cho (JP); Kazuhiro Tomosue, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 16/174,776

(22) Filed: Oct. 30, 2018

(65) Prior Publication Data

US 2019/0163997 A1 May 30, 2019

(30) Foreign Application Priority Data

Nov. 24, 2017 (JP) ................................ 2017-225751

(51) Int. Cl.
*G06K 9/00* (2006.01)
*G05D 1/02* (2020.01)

(52) U.S. Cl.
CPC ..... *G06K 9/00845* (2013.01); *G06K 9/00288* (2013.01); *G06K 9/00926* (2013.01); *G05D 1/0231* (2013.01); *G05D 1/0257* (2013.01); *G05D 2201/0213* (2013.01); *G06K 9/00791* (2013.01)

(58) Field of Classification Search
CPC ........... G06K 9/00845; G06K 9/00926; G06K 9/00288; G06K 9/00791; G05D 1/0231; G05D 2201/0213; G05D 1/0257; B60W 40/08; B60W 2420/42; B60W 2040/0818
See application file for complete search history.

(56) References Cited

U.S. PATENT DOCUMENTS 8,587,440 B2   11/2013  Weng et al.
2011/0068934 A1*  3/2011  Weng ....................... A61B 5/18
                                                 340/575
2019/0122060 A1*  4/2019  Sudo ....................... B60Q 9/00

* cited by examiner

*Primary Examiner* — Dhaval V Patel
(74) *Attorney, Agent, or Firm* — Sughrue Mion, PLLC

(57) ABSTRACT

A control system comprising a reference image setting part setting a reference image of the face of the driver based on the image captured by the driver monitor camera, a monitoring part monitoring a condition of the driver based on the image captured by the driver monitor camera and the reference image, a first judging part judging if the face of the driver can no longer be recognized when monitoring the condition of the driver, a second judging part judging if the driver has been changed when the face of the driver can no longer be recognized, and a reference image resetting part resetting the reference image of the face of the driver based on the image captured by the driver monitor camera when it is judged that the driver has been changed.

11 Claims, 3 Drawing Sheets

CONTROL SYSTEM

CROSS-REFERENCE TO RELATED APPLICATION

This application claims priority based on Japanese Patent Application No. 2017-225751 filed with the Japan Patent Office on Nov. 24, 2017, the entire contents of which are incorporated into the present specification by reference.

FIELD

The present disclosure relates to a control system for a vehicle.

BACKGROUND

The specification of U.S. Pat. No. 8,587,440 discloses a conventional control system of a vehicle configured to use a driver monitor camera to capture an image of a driver and confirm the face of the driver based on the same.

SUMMARY

If monitoring the condition of a driver based on the image of the driver captured by a driver monitor camera, it is necessary to first detect (learn) the positions of the two eyes or the position of the nose of the driver, the distance between the two eyes, etc. based on the image of the driver captured by the driver monitor camera, set the image of the face of the driver as a reference (reference image), then compare that reference image and the image of the driver captured at any time by the driver monitor camera. Due to this, for example, the driver condition such as in which direction the face of the driver is oriented is monitored.

This reference image of the face of the driver need only be set one time when the driver changes, but while the driver condition is being monitored, sometimes the driver will change his or her posture resulting in the face of the driver ending up temporarily departing from the inside of the field of view of the driver monitor camera or resulting in the face of the driver ending up temporarily concealed by an object or the hand of the driver.

In such a case, the face of the driver will temporarily no longer be able to be recognized. In the case for example of a vehicle being driven by automated driving, the driver may conceivably be changed during the automated driving. For this reason, in the above-mentioned conventional control system of a vehicle, it is not possible to judge whether the temporary failure to recognize the face of the driver was caused by the driver having been changed or was caused by, though the driver has not been changed, a change of his or her posture etc.

To set the reference image, as explained above, it is necessary to detect the positions of the two eyes or the position of the nose of the driver, the distance between the two eyes, etc., so a certain extent of time becomes required. For this reason, despite the driver not having been changed, the change in the posture etc. causes the face of the driver to temporarily no longer be able to be recognized. If, because of this, configuring the system so that when the driver monitor camera next captures the face of the driver, the reference image of that face is set, there is the problem that the driver condition can no longer be monitored during the period when setting the reference image.

The present disclosure was made focusing on such a problem and has as its object to keep the reference image from being reset and the driver condition from no longer being able to be monitored during the reset period despite the driver not having been changed.

To solve the above technical problem, according to one aspect of the present disclosure, there is provided a control system for controlling a vehicle provided with a driver monitor camera capturing an image of a face of a driver, comprising a reference image setting part configured so as to set a reference image of the face of the driver based on the image captured by the driver monitor camera, a monitoring part configured so as to monitor a condition of the driver based on the image captured by the driver monitor camera and the reference image, a first judging part configured so as to judge if the face of the driver can no longer be recognized when monitoring the condition of the driver, a second judging part configured so as to judge if the driver has been changed when the face of the driver can no longer be recognized, and a reference image resetting part configured to reset the reference image of the face of the driver based on the image captured by the driver monitor camera when it is judged that the driver has changed.

According to this aspect of the present disclosure, it is possible to keep a reference image from being reset and the driver condition from no longer being able to be monitored during the reset period despite the driver not having been changed.

DESCRIPTION OF EMBODIMENTS

Figure 1:
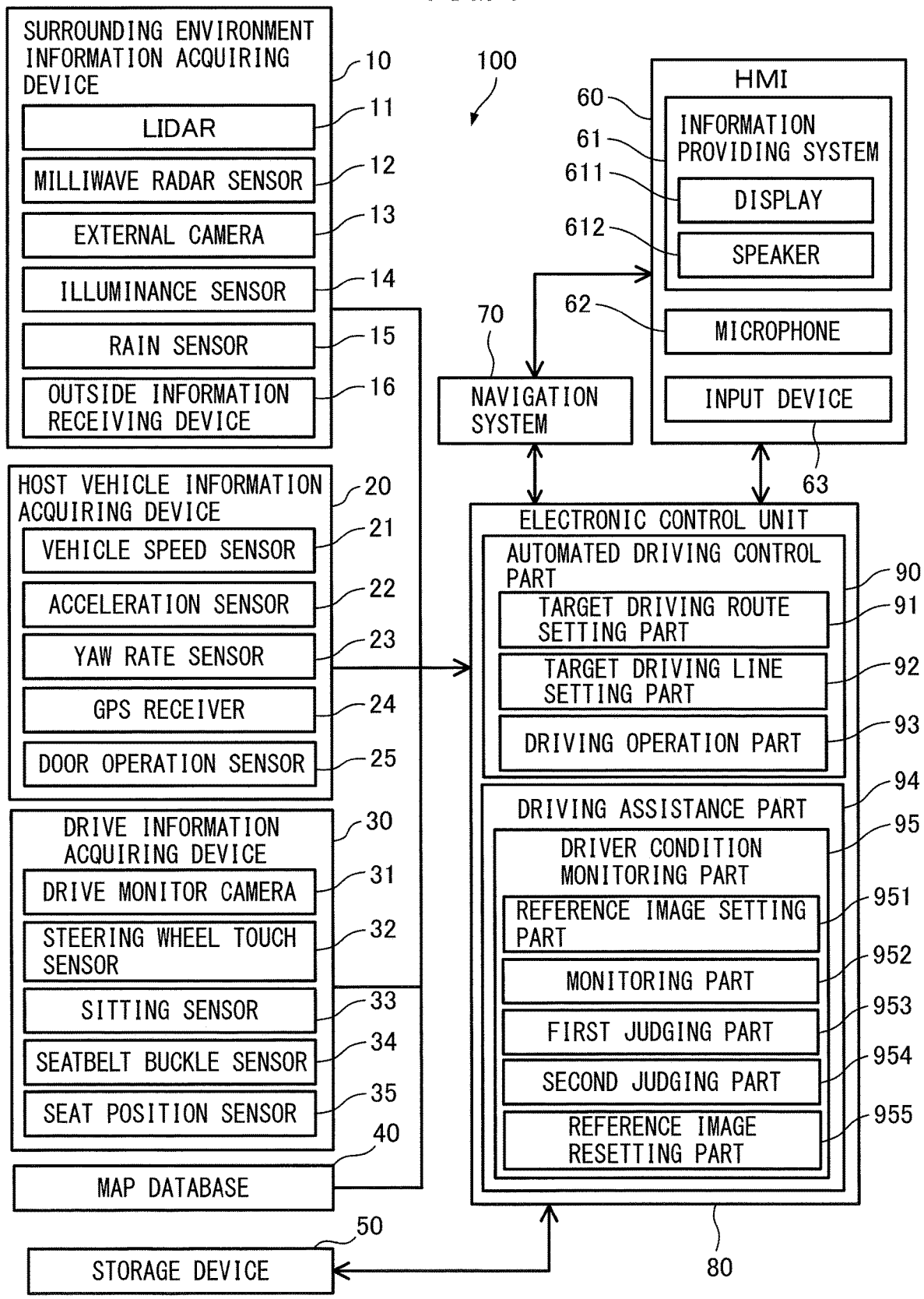
FIG. 1 is a schematic view of the configuration of an automated driving system for a vehicle according to one embodiment of the present disclosure.

Below, referring to the drawings, embodiments of the present invention will be explained in detail. Note that, in the following explanation, similar component elements will be assigned the same reference notations.

Figure 2:
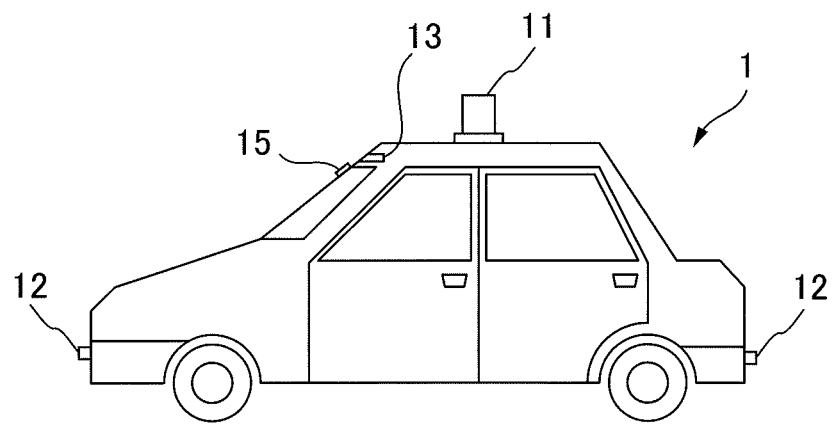
FIG. 2 is a schematic external view of a host vehicle mounting an automated driving system according to one embodiment of the present disclosure.
Figure 3:
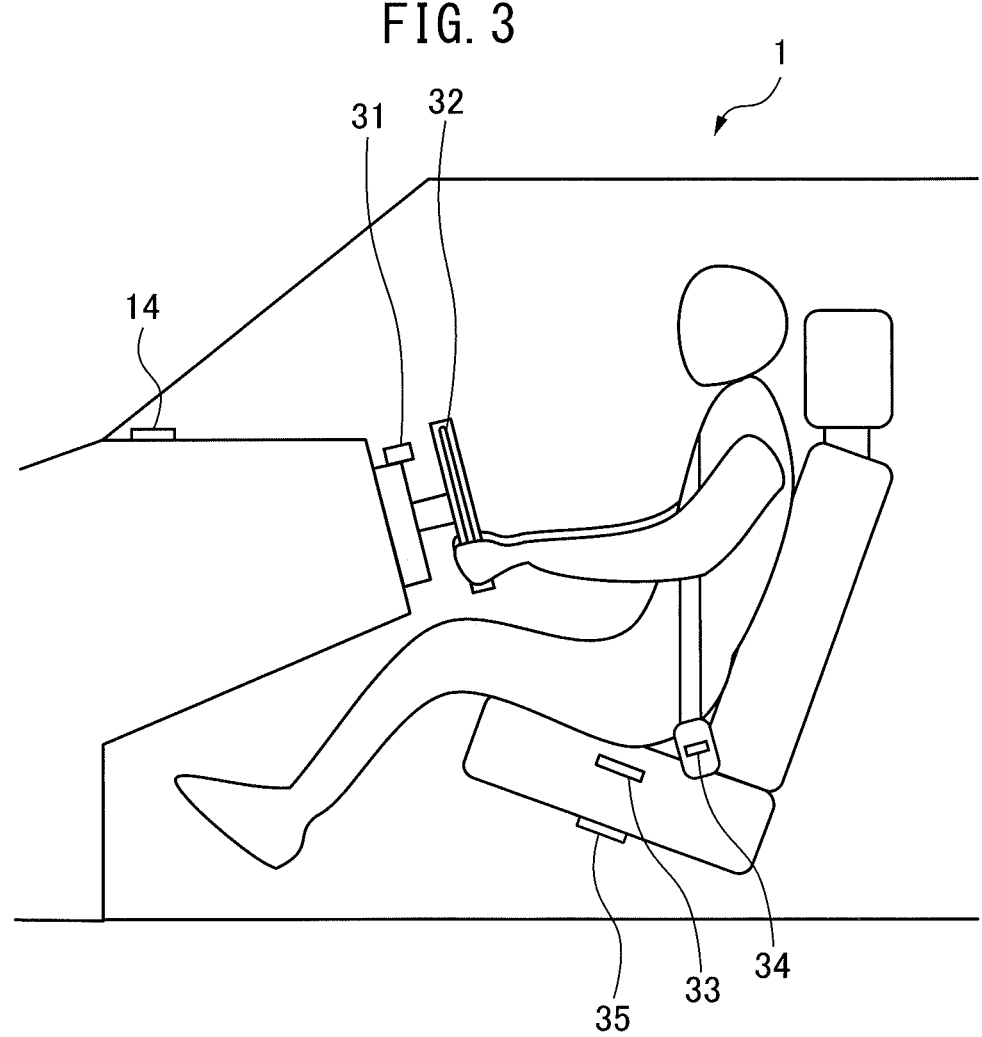
FIG. 3 is a schematic internal view of a host vehicle mounting an automated driving system according to one embodiment of the present disclosure.

FIG. 1 is a schematic view of the configuration of an automated driving system 100 of a vehicle according to one embodiment of the present invention. FIG. 2 is a schematic view of the appearance of a host vehicle 1 mounting the automated driving system 100 according to the present embodiment. FIG. 3 is a schematic view of the inside of the host vehicle 1 mounting the automated driving system 100 according to the present embodiment.

As shown in FIG. 1, the automated driving system 100 according to the present embodiment is provided with a surrounding environment information acquiring device 10, a host vehicle information acquiring device 20, a driver information acquiring device 30, a map database 40, a storage device 50, a human-machine interface (below, referred to as an "HMI") 60, a navigation system 70, and an electronic control unit 80.

The surrounding environment information acquiring device 10 is a device for acquiring information relating to obstacles in the surroundings of the host vehicle (for example, buildings, moving vehicles such as vehicles in front of it and in back of it on the road and oncoming vehicles, stopped vehicles, the curb, fallen objects, pedestrians, etc.) and the weather and other such surrounding environmental conditions of the host vehicle 1 (below, referred to as the "surrounding environment information"). As shown in FIG. 1 to FIG. 3, the surrounding environment information acquiring device 10 according to the present embodiment is provided with a LIDAR (laser imaging detection and ranging) device 11, milliwave radar sensors 12, an external camera 13, illuminance sensor 14, rain sensor 15, and outside information receiving device 16.

The LIDAR device 11 uses laser beams to detect the road and obstacles in the host vehicle surroundings. As shown in FIG. 2, in the present embodiment, the LIDAR device 11 is, for example, attached to the roof of the host vehicle 1. The LIDAR device 11 successively fires laser beams toward the overall surroundings of the host vehicle 1 and measures the distances to the road and host vehicle surroundings from the reflected light. Further, the LIDAR device 11 uses the results of measurement as the basis to generate 3D images of the road and obstacles in the overall surroundings of the host vehicle 1 and sends information of the generated 3D images to the electronic control unit 80.

Note that, the locations of attachment and number of units of the LIDAR device 11 are not particularly limited so long as the information necessary for generating a three-dimensional image can be acquired. For example, they may also be divided and attached to the grilles or to the insides of the headlights or brake lights and other such lights of the host vehicle 1 or may be divided and attached to parts of the body (frame) of the host vehicle 1.

The milliwave radar sensors 12 utilize electromagnetic waves to detect obstacles in the host vehicle surroundings at a farther distance than the LIDAR device 11. As shown in FIG. 2, in the present embodiment, the milliwave radar sensors 12, for example, are attached to the front bumper and rear bumper of the host vehicle 1. The milliwave radar sensors 12 emit electromagnetic waves to the surroundings of the host vehicle 1 (in the present embodiment, the front, rear, and sides of the host vehicle 1) and use the reflected waves to measure the distances to obstacles in the host vehicle surroundings and the relative speed with the obstacles. Further, the milliwave radar sensors 12 send the results of measurement as host vehicle surrounding information to the electronic control unit 80.

Note that, the locations of attachment and number of the milliwave radar sensors 12 are not particularly limited so long as the necessary host vehicle surrounding information can be acquired. For example, they may also be attached to the grilles or to the insides of the headlights or brake lights and other such lights of the host vehicle 1 or may be attached to parts of the body (frame) of the host vehicle 1.

The external camera 13 captures an image of the area in front of the host vehicle 1. As shown in FIG. 2, in the present embodiment, the external camera 13 is, for example, attached to the center part of the front of the roof of the host vehicle 1. The external camera 13 processes the captured image of the area in front of the host vehicle to detect information on obstacles in front of the host vehicle, the width of the lane of the road driven on and the road shape, road signs, white lines, the state of traffic lights, and other road information in the area in front of the host vehicle, the yaw angle (relative direction of vehicle with respect to lane driven on), the offset position of the vehicle from the center of the lane driven on, and other such driving information of the host vehicle 1, rain or snow or fog and other such weather information of the host vehicle surroundings, etc. Further, the external camera 13 sends the detected image information to the electronic control unit 80.

Note that, the locations of attachment and number of the external cameras 13 are not particularly limited so long as the area in front of the host vehicle 1 can be captured. For example, they may also be attached to the upper center part of the inner surface of the windshield inside the host vehicle.

The illuminance sensor 14 detects the illuminance in the host vehicle surroundings. As shown in FIG. 2, in the present embodiment, the illuminance sensor 14 is, for example, attached to the top surface of the instrument panel of the host vehicle. The illuminance sensor 14 sends the detected illuminance information of the host vehicle surroundings to the electronic control unit 80.

The rain sensor 15 detects the presence of rainfall and the amount of rainfall. As shown in FIG. 2, in the present embodiment, the rain sensor 15 is, for example, attached to the top of the center of the front surface of the front glass of the host vehicle 1. The rain sensor 15 fires light generated by a built-in light emitting diode toward the front surface of the front glass and measures the change in the reflected light at that time so as to detect the presence of rainfall, the amount of rainfall, and other rainfall information. Further, the rain sensor 15 sends the detected rainfall information to the electronic control unit 80.

The outside information receiving device 16, for example, receives congestion information, weather information (rain, snow, fog, wind speed, and other information), and other outside information road sent from a traffic information communication system center or other outside communication center. The outside information receiving device 16 sends the received outside information to the electronic control unit 80.

The host vehicle information acquiring device 20 is a device for acquiring information relating to the state of the host vehicle 1 such as the speed or acceleration, posture, and current position of the host vehicle 1 (below, referred to as the "host vehicle information"). As shown in FIG. 1, the host vehicle information acquiring device 20 according to the present embodiment is provided with a vehicle speed sensor 21, acceleration sensor 22, yaw rate sensor 23, GPS receiver 24, and door operation sensor 25.

The vehicle speed sensor 21 is a sensor for detecting the speed of the host vehicle 1. The vehicle speed sensor 21 sends the detected vehicle speed information of the host vehicle 1 to the electronic control unit 80.

The acceleration sensor 22 is a sensor for detecting the acceleration of the host vehicle 1 at the time of accelerating or the time of braking. The acceleration sensor 22 sends the detected acceleration information of the host vehicle 1 to the electronic control unit 80.

The yaw rate sensor 23 is a sensor for detecting the posture of the host vehicle 1, more specifically detects the speed of change of the yaw angle at the time the host vehicle 1 turns, that is, the rotational angular speed (yaw rate) about the vertical axis of the host vehicle 1. The yaw rate sensor 23 sends the detected posture information of the host vehicle 1 to the electronic control unit 80.

The GPS receiver 24 receives signals from three or more GPS satellites to identify the longitude and latitude of the host vehicle 1 and detect the current position of the host vehicle 1. The GPS receiver 24 sends the detected current position information of the host vehicle 1 to the electronic control unit 80.

The door operation sensor 25 is a sensor for detecting operation of a door of the host vehicle 1. The door operation sensor 25 sends the detected door operation information to the electronic control unit 80.

The driver information acquiring device 30 is a device for acquiring information relating to the condition of the driver of the host vehicle 1 (below, referred to as the "driver information"). As shown in FIG. 1 and FIG. 3, the driver information acquiring device 30 according to the present embodiment comprises a driver monitor camera 31, steering wheel touch sensor 32, sitting sensor 33, seatbelt buckle sensor 34, and seat position sensor 35.

The driver monitor camera 31 is attached to the top surface of the steering column and captures the external appearance of the driver. The driver monitor camera 31 processes the video of the driver captured by image processing to thereby detect the external appearance information of the driver such as the expression or posture of the driver. Further, the driver monitor camera 31 sends the detected external appearance information of the driver to the electronic control unit 80.

The steering wheel touch sensor 32 is attached to the steering wheel. The steering wheel touch sensor 32 detects whether the driver is gripping the steering wheel and sends the detected information on the gripping of the steering wheel to the electronic control unit 80.

The sitting sensor 33 is provided at the bottom of the surface of the seat. The sitting sensor 33 detects the load applied to the surface of the seat and sends sitting information indicating if the driver is sitting on the seat to the electronic control unit 80.

The seatbelt buckle sensor 34 is housed inside the seatbelt buckle and sends seatbelt fastening information indicating if the seatbelt is connected to the seatbelt buckle, that is, if the driver has fastened his or her seatbelt, to the electronic control unit 80.

The seat position sensor 35 is a sensor detecting a seat position (front-back position of the seat) and sends seat position information indicating if the driver has moved the seat to the electronic control unit 80.

The map database 40 is a database relating to map information. This map database 40 is for example stored in a hard disk drive (HDD) mounted in the vehicle. The map information includes positional information on the roads, information on the road shapes (for example, curves or straight stretches, curvature of curves, etc.), positional information on the intersections and turn-off points, information on the road types, etc.

The storage device 50 stores a road map designed for automated driving. The automated driving use road map is prepared by the electronic control unit 80 based on the 3D image generated by the LIDAR device 11 and constantly or periodically updated by the electronic control unit 80.

The HMI 60 is an interface for input and output of information between the driver or a vehicle passenger and the automated driving system 100. The HMI 60 according to the present embodiment is provided with an information device 61 for providing the driver with various types of information, a microphone 62 for recognizing the voice of the driver, and a touch panel or operating buttons or other input operating device 63 for the driver to perform an input operation.

The information device 61 is provided with a display 611 for displaying text information or image information and a speaker 612 for generating sound.

The navigation system 70 is a system for guiding the host vehicle 1 to a destination set by the driver through the HMI 60. The navigation system 70 sets the driving route until the destination based on the current position information of the host vehicle 1 detected by the GPS receiver 24 and map information of the map database 40 and sends information relating to the set driving route as navigation information to the electronic control unit 80.

The electronic control unit 80 is a microcomputer comprised of components connected with each other by a bidirectional bus such as a central processing unit (CPU), read only memory (ROM), random access memory (RAM), input port, and output port.

The electronic control unit 80 is provided with an automated driving control part 90 and is configured to be able to automatically perform driving operations relating to acceleration, steering, and braking to make the vehicle run as automated driving when the driver switches from the manual driving mode (mode where driving operations relating to acceleration, steering, and braking are performed by the driver) to the automated driving mode. Specifically, the automated driving control part 90 is configured provided with a target driving route setting part 91, a target driving line setting part 92, and a driving operation part 93.

The target driving route setting part 91 sets the target driving route of the vehicle in the automated driving mode. Specifically, the target driving route setting part 91 sets the driving route up to the destination included in the navigation information as the target driving route.

The target driving line setting part 92 sets the target driving line when driving along a driving lane on the target driving route. Specifically, the target driving line setting part 92 sets as the target driving line the driving line enabling the road in front of the host vehicle to be passed by a suitable speed corresponding to the road situation (degree of congestion, road shape, road surface conditions, etc.) based on obstacle information of the surroundings of the host vehicle (information on vehicles in front, fallen objects, etc.), road information on the road in front of the host vehicle such as the width of the driving lane or road shape, and speed information of the host vehicle.

The driving operation part 93 automatically performs driving operations relating to acceleration, steering, and braking so that the vehicle runs along the target driving line. Specifically, the driving operation part 93 controls the various control parts required for driving operations relating to acceleration, steering, and braking based on the surrounding environment information, host vehicle information, and, as necessary, driver information and various other types of information and automatically performs driving operations of the vehicle.

Further, the electronic control unit 80 is provided with a driving assistance part 94 in addition to the automated driving control part 90 and is configured to be able to automatically perform various types of driving assistance aimed at securing the safety of the driver during the manual driving mode and automated driving mode.

The driving assistance part 94 according to the present embodiment, for providing such driving assistance, is provided with a driver condition monitoring part 95 for monitoring the condition of the driver based on the image of the driver captured by the driver monitor camera 31, that is, the above-mentioned external appearance information of the driver and, for example, is configured so as to be able to prompt the driver to pay attention when driving distracted etc. and being lax in monitoring the surroundings and otherwise perform driving assistance suitable for a condition of the driver.

Here, the driver condition monitoring part 95 according to the present embodiment is configured to first detect (learn) the positions of the two eyes or position of the nose of the driver, the distance between the two eyes, etc. based on the image captured by the driver monitor camera 31 (that is, the external appearance information of the driver), set an image of the face of the driver serving as a reference (reference image), and compare the reference image and the image of the face of the driver captured at any moment by the driver monitor camera 31 (that is, the external appearance information of the driver sent at any time) to thereby monitor in which direction the face of the driver or line of sight is facing or other driver conditions.

That is, the driver condition monitoring part 95 is configured provided with a reference image setting part 951 for setting a reference image of the face of the driver based on the image captured by the driver monitor camera 31 and a monitoring part 952 for monitoring the condition of the driver based on the image captured by the driver monitor camera 31 and the reference image.

Here, the reference image may be set just once when the driver changes, but while monitoring the driver condition, the driver may change his or her posture resulting in the face of the driver ending up temporarily departing from the field of view of the driver monitor camera 31 or an object or hand of the driver may end up causing the face of the driver to be temporarily concealed.

In such a case, the face of the driver will temporarily no longer be able to be recognized, but, for example, in a vehicle in which automated driving is performed, the driver may conceivably be changed during the automated driving. In this case as well, the face of the driver will temporarily become unable to be recognized.

Therefore, if ending up configuring the driver condition monitoring part 95 in the above way, that is, configuring it provided with only the reference image setting part 951 and monitoring part 952, it would not be possible to judge if the reason why the face of the driver temporarily could no longer be recognized was due to a change in the posture of the driver etc. or was due to the driver having been changed.

If the reason why the face of the driver temporarily could no longer be recognized was due to the driver having been changed, unless resetting the reference image, the driver condition is liable to be monitored based on the reference image of the other driver of before the change. As a result, the driver condition is liable to be unable to be monitored normally.

On the other hand, to set the reference image of the face of the driver, as explained above, it is necessary to detect the positions of the two eyes or position of the nose of the driver, the distance between the two eyes, etc., so a certain extent of time becomes necessary. For this reason, if configuring the system so as to set the reference image of the face of the driver when next captured by the driver monitor camera 31 after a change in posture etc. causes the face of the driver to temporarily become unable to be recognized despite the driver not having been changed, it will no longer be possible to monitor the driver condition during the period for setting the reference image.

Therefore, in the present embodiment, the driver condition monitoring part 95 was configured so as to judge if the driver has been changed when the face of the driver can no longer be recognized while monitoring the driver condition and so as to reset the reference image of the face of the driver only when judging that the driver has been changed.

That is, the driver condition monitoring part 95 was configured to be further provided with a first judging part 953 for judging if the face of the driver can no longer be recognized based on the image captured by the driver monitor camera, a second judging part 954 for judging if the driver has been changed when the face of the driver can no longer be recognized, and a reference image resetting part 955 for resetting the reference image of the face of the driver based on the image captured by the driver monitor camera when it is judged that the driver has changed. Below, the driver condition monitoring control according to the present embodiment will be explained.

Figure 4:
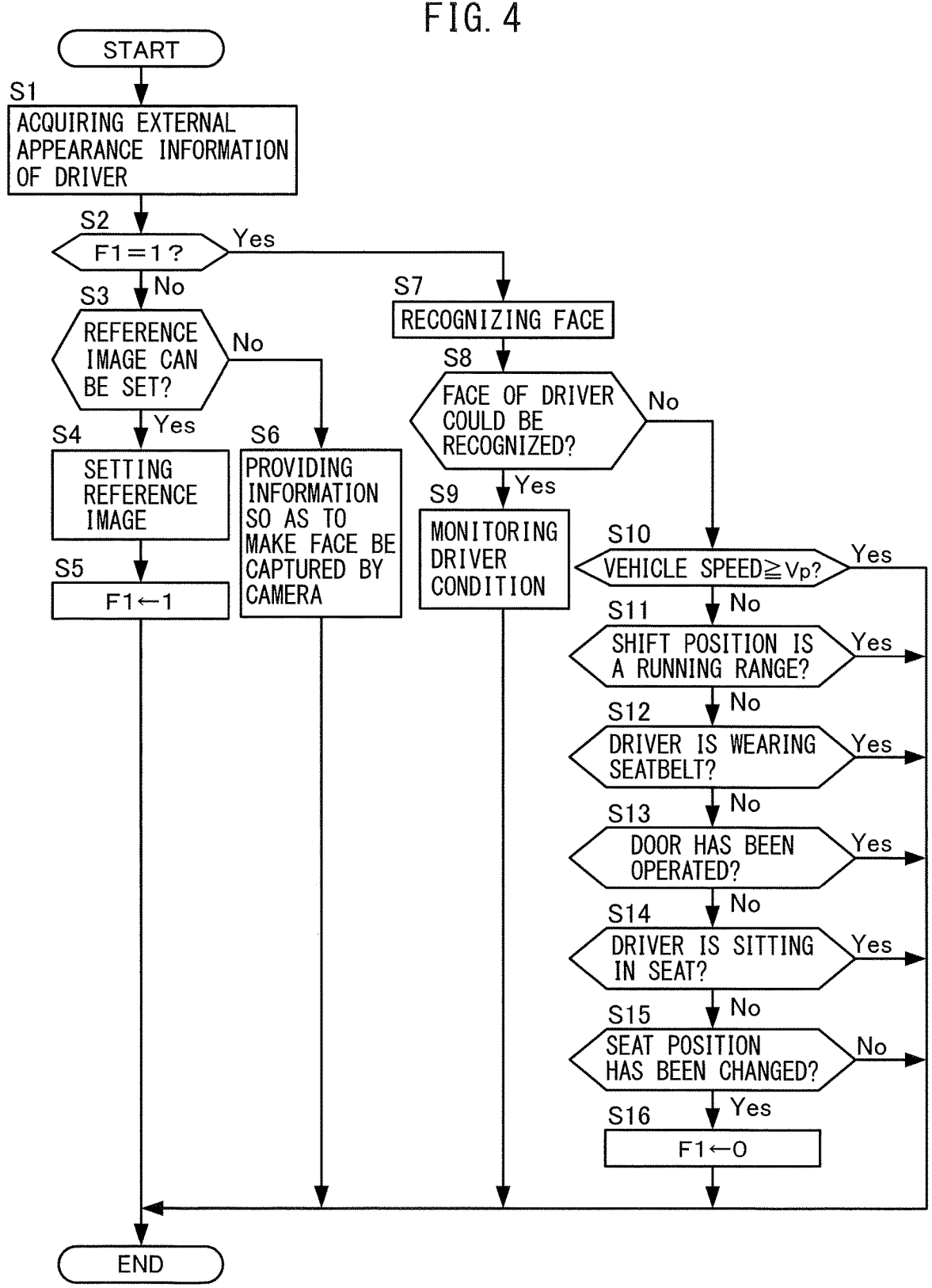
FIG. 4 is a flow chart for explaining driver condition monitoring control according to one embodiment of the present disclosure.

FIG. 4 is a flow chart for explaining the driver monitoring control according to the present embodiment. The electronic control unit 80 repeatedly performs the present routine by a predetermined processing period during operation of the vehicle.

At step S1, the electronic control unit 80 acquires external appearance information of the driver.

At step S2, the electronic control unit 80 judges if a reference image setting flag F1 has been set to "1". The reference image setting flag F1 is a flag with an initial value set to "0" and is set to "1" when first setting or when resetting the reference image. The electronic control unit 80 proceeds to the processing of step S3 if the reference image setting flag F1 is "0". On the other hand, the electronic control unit 80 proceeds to the processing of step S7 if the reference image setting flag F1 is "1".

At step S3, the electronic control unit 80 judges if the reference image can be set. Specifically, the electronic control unit 80 judges if the position of the two eyes or the position of the nose of the driver, the distance between the two eyes, etc. can be detected from the external appearance information of the driver, that is, if it can recognize the face of the driver based on the external appearance information of the driver. If the electronic control unit 80 can recognize the face of the driver based on the external appearance information of the driver, it judges that the reference image can be set and proceeds to the processing of step S4. On the other hand, the electronic control unit 80 proceeds to the processing of step S6 if, for example, the face of the driver does not fit inside the field of view of the driver monitor camera 31, part of the face of the driver ends up being concealed behind the hand or an object, or otherwise when the face of the driver cannot be recognized based on the external appearance information of the driver.

At step S4, the electronic control unit 80 sets the image of the face of the driver recognized based on the external appearance information of the driver as the reference image of the driver.

At step S5, the electronic control unit 80 sets the reference image setting flag F1 to "1".

At step S6, the electronic control unit 80 provides the driver with text information or voice information such as "Please turn your face to the camera" through, for example, the information device 61 and prompts the driver to make the face of the driver be captured by the driver monitor camera 31.

At step S7, the electronic control unit 80 recognizes the face of the driver based on the external appearance information of the driver.

At step S8, the electronic control unit 80 judges if the face of the driver could be recognized. The electronic control unit 80 proceeds to the processing of step S9 if it could recognize the face of the driver based on the external appearance information of the driver. On the other hand, the electronic control unit 80 proceeds to the processing of step S10 if it could not recognize the face of the driver.

At step S9, the electronic control unit 80 compares the reference image and the image of the face of the driver recognized based on the external appearance information of the driver so as to monitor the driver condition.

At step S10, the electronic control unit 80 judges if the vehicle speed is a predetermined vehicle speed Vp (for example 10 km/h) or more. The electronic control unit 80 can judge that the possibility of the driver being changed is low if the vehicle speed is the predetermined vehicle speed Vp or more when driving by a certain extent of vehicle speed during manual driving of course and also during automated driving, so ends the current processing so as not to reset the reference image. On the other hand, the electronic control unit 80 judges that there is undeniably a possibility of the driver having been changed and proceeds to the processing of step S11 if the vehicle speed is less than the predetermined vehicle speed Vp.

At step S11, the electronic control unit 80 judges if the shift position is a running range (D range or R range). This is because a driver generally will basically shift to the position of the parking range (P range) or neutral range (N range) when changing over and the possibility of taking over driving while in a running range is considered to be low. Therefore, the electronic control unit 80 judges that the possibility of the driver having been changed is low and ends the current processing so as not to reset the reference image if the shift position is a running range. On the other hand, the electronic control unit 80 judges that there is undeniably the possibility of the driver having been changed and proceeds to the processing of step S12 if the shift position is not a running range.

At step S12, the electronic control unit 80 judges if the driver is wearing his or her seatbelt based on the seatbelt fastening information. The electronic control unit 80 judges that the possibility of the driver having been changed is low and ends the current processing so that the reference image is not reset if the driver is wearing his or her seatbelt. On the other hand, the electronic control unit 80 judges that there is undeniably the possibility of the driver having been changed and proceeds to the processing of step S13 if the driver is not wearing his or her seatbelt.

At step S13, the electronic control unit 80 judges if the door has been operated based on the door operating information. The electronic control unit 80 judges that the possibility of the driver having been changed is low and ends the current processing so that the reference image is not reset if the door has not been operated. On the other hand, the electronic control unit 80 judges that there is undeniably the possibility of the driver having been changed and proceeds to the processing of step S14 if the door has been operated.

At step S14, the electronic control unit 80 judges if the driver is sitting in the seat based on the sitting information. The electronic control unit 80 judges that the possibility of the driver having been changed is low if the driver is sitting in the seat and ends the current processing so that the reference image is not reset. On the other hand, the electronic control unit 80 judges that there is undeniably the possibility of the driver having been changed and proceeds to the processing of step S15 if the driver is not sitting in the seat.

At step S15, the electronic control unit 80 judges if the seat position has been changed based on the seat position information. This is because when the driver has been changed, the possibility of the seat position being changed is high. The electronic control unit 80 judges that the possibility of the driver having been changed is low and ends the current processing so that the reference image is not reset if the seat position has not been changed. On the other hand, the electronic control unit 80 judges that there is undeniably the possibility of the driver having been changed and proceeds to the processing of step S16 if the seat position has been changed.

At step S16, the electronic control unit 80 returns the reference image setting flag F1 to "0" to reset the reference image since there is undeniably the possibility of the driver having been changed.

According to the present embodiment explained above, there is provided an electronic control unit 80 (control system) for controlling a vehicle provided with a driver monitor camera 31 capturing an image of a face of the driver, configured comprising a reference image setting part 951 setting a reference image of the face of the driver based on the image captured by the driver monitor camera 31, a monitoring part 952 monitoring a condition of the driver based on the image captured by the driver monitor camera 31 and the reference image, a first judging part 953 judging if the face of the driver can no longer be recognized when monitoring the condition of the driver, a second judging part 954 judging if the driver has been changed when the face of the driver can no longer be recognized, and a reference image resetting part 955 resetting the reference image of the face of the driver based on the image captured by the driver monitor camera 31 when it is judged that the driver has changed.

In this way, according to the present embodiment, it is judged if the driver has been changed and the reference image of the face of the driver is reset only when judging that the driver has been changed, so it is possible to prevent the reference image from being reset and the driver condition from becoming unable to be monitored during the reset period despite the driver not having been changed.

The second judging part 954 can be configured so as to judge that the driver has not been changed when the face of the driver can no longer be recognized if for example the vehicle speed is a predetermined vehicle speed Vp or more. Further, in addition to this, for example, it may be configured so as to judge that the driver has not been changed when the driver is wearing his or her seatbelt, when the shift position is in the running range, when the door has not been operated, when the driver is sitting in the seat, or when the seat position has not been changed.

By configuring the second judging part 954 in this way, it is possible to accurately judge the driver being changed.

Above, embodiments of the present disclosure were explained, but the above embodiments only show part of the examples of application of the present disclosure. They are not intended to limit the technical scope of the present disclosure to the specific constitutions of the embodiments.

For example, in the above embodiments, whether or not the driver has been changed was judged from step S10 to step S15 of the flow chart of FIG. 4, but the order of judgment may be suitably changed. Further, it is sufficient to perform at least one of the processings from step S10 to step S15. Furthermore, it is possible to add processing other than this for judging if the driver has been changed.

The invention claimed is:

1. A control system for controlling a vehicle,
the vehicle comprising a driver monitor camera capturing an image of a face of a current driver, wherein
the control system comprises:
a reference image setting part configured so as to set a reference image of the face of the current driver based on the image captured by the driver monitor camera;

a monitoring part configured so as to monitor a condition of the current driver based on the image captured by the driver monitor camera and the reference image;

a first judging part configured so as to judge if the face of the current driver is no longer recognized when monitoring the condition of the current driver;

a second judging part configured so as to judge if the current driver has been changed to a new driver when the face of the current driver is no longer recognized; and a reference image resetting part configured to reset the reference image of the face of the current driver based on the image captured by the driver monitor camera if the second judging part judges that the current driver has changed to the new driver, the reference image resetting part not resetting the reference image of the face of the current driver if the second judging part judges that the current driver has not changed to the new driver when the face of the current driver is no longer recognized.

2. The control system according to claim 1, wherein the second judging part is configured so as to judge that the current driver has not been changed when the face of the current driver is longer recognized if the vehicle speed is a predetermined vehicle speed or more.

3. The control system according to claim 1, wherein the second judging part is configured so as to judge that the current driver has not been changed when the face of the current driver is no longer recognized if the current driver is wearing his or her seatbelt.

4. The control system according to claim 1, wherein the second judging part is configured so as to judge that the current driver has not been changed when the face of the current driver is no longer recognized if the shift position is in a running range.

5. The control system according to claim 1, wherein the second judging part is configured so as to judge that the current driver has not been changed when the face of the current driver is no longer recognized if the door is not being operated.

6. The control system according to claim 1, wherein the second judging part is configured so as to judge that the current driver has not been changed when the face of the current driver is no longer be recognized if the current driver is sitting in the seat.

7. The control system according to claim 1, wherein the second judging part is configured so as to judge that the current driver has not been changed when the face of the current driver is no longer recognized if the seat position has not been changed.

8. The control system according to claim 1, further comprising an automated driving system configured to automatically perform driving operations of the vehicle during an automated driving mode.

9. The control system according to claim 8, wherein the vehicle includes a switch for switching between a manual driving mode and the automated driving mode.

10. The control system according to claim 8, wherein the driving operations during the automated driving mode include acceleration, steering and braking of the vehicle.

11. The control system according to claim 8, wherein the automated driving system includes:

a target driving route setting part for setting the target driving route of the vehicle;

a target driving line setting part for setting a target driving line that enables driving of the vehicle by a speed corresponding to road situation information, obstacle information, road configuration information and vehicle speed information; and a driving operation part for performing operations relating to acceleration, steering and braking based on surrounding environment information.

\* \* \* \* \*